United States Patent [19]
Wirtz

[11] Patent Number: 5,370,726
[45] Date of Patent: Dec. 6, 1994

[54] METALLOTHERMAL REACTION MIXTURE

[75] Inventor: Johann-Hugo Wirtz, Essen, Germany

[73] Assignee: Elektro-Thermit GmbH, Essen, Germany

[21] Appl. No.: 96,112

[22] Filed: Jul. 22, 1993

[30] Foreign Application Priority Data

Aug. 14, 1992 [DE] Germany ............... 4226982

[51] Int. Cl.$^5$ ............................. C21B 15/02
[52] U.S. Cl. ................................. 75/315
[58] Field of Search ............ 75/959, 315, 314, 959; 149/37; 266/167

[56] References Cited

U.S. PATENT DOCUMENTS

| | | | |
|---|---|---|---|
| 4,104,445 | 8/1978 | Dobo | 75/229 |
| 5,035,756 | 7/1991 | Covino | 149/37 |
| 5,171,378 | 12/1992 | Kovarik et al. | 75/959 |
| 5,215,727 | 6/1993 | Zeller, III et al. | 423/55 |

FOREIGN PATENT DOCUMENTS

| | | | |
|---|---|---|---|
| 96317 | 3/1895 | Germany. | |
| 3211831 | 10/1983 | Germany. | |
| 191167 | 1/1923 | United Kingdom | 75/959 |

*Primary Examiner*—Melvyn J. Andrews
*Attorney, Agent, or Firm*—Anderson Kill Olick & Oshinsky

[57] ABSTRACT

A metallothermal reaction mixture consisting of a metal oxide, a metal that is more electronegative than the metal of the metal oxide and, optionally, further additives, the individual components being present in the form of small particles, is prepared in which at least 20% by weight of the metal oxide is present in the form of spherical or at least approximately spherical particles ranging in size from >0 to 3.0 mm. A stabilization and evening out of the reaction is achieved by the invention composition of the reaction mixture.

3 Claims, No Drawings

5,370,726

METALLOTHERMAL REACTION MIXTURE

FIELD OF INVENTION

The invention relates to a metallothermal reaction mixture consisting of a metal oxide, a metal that is more electronegative than metal of the metal oxide and, optionally, further additives, the individual components being present in the form of small particles.

BACKGROUND INFORMATION AND PRIOR ART

Metallothermal reactions and mixtures for carrying out the reactions have been known for more than 100 years. The metallothermal reaction is based on the reduction of a metal oxide by a metal which is more electronegative than the metal of the metal oxide. The reaction, after local ignition of the reaction mixture, propagates with the evolution of heat more or less rapidly through the metallothermal reaction mixture. At the same time, the more electronegative metal is oxidized and floats as a molten slag, while the melt of the more electropositive metal separates from the slag and collects in the lower part of the reaction vessel. Technically, aluminothermal and calciothermal reaction mixtures have proven to be successful, in particular, for the production of iron and steel melts as well as of carbon-free metals and special alloys.

To begin with, it is difficult to carry out the metallothermal, highly exothermic reaction in a technically manageable form. It is important in this regard to start the reaction by punctiform ignition with an easily ignitable pyrophoric mass or by a magnesium foil, as was described for the first time in 1895 in the German patent 96 317.

To achieve a steel melt of a particular composition, alloying elements must be added in different form and composition to the iron oxide/aluminum mixture. Alloying partners can be added to the reaction mixture as metals in grit form or in the form of their oxides or other chemical compounds. It is possible to add carbon in free form or in the form of carbide, in order to bring about a carburization of the aluminothermally produced steel. Materials to attenuate the exothermic reaction, in the form of, for example, grey cast iron waste pieces, structural steel stamping waste, etc. can be added to the reaction mixture.

In all these cases, however, to achieve a reproducible reaction product, it is necessary that the aluminothermal or generally the metallothermal reaction proceeds as uniformly as possible and that this uniform course of the reaction is reproducible. If the reaction proceeds at different rates, the consumption of the alloy-forming components can proceed differently. This leads to alloys of different composition and, with that, also of different properties. If the reaction is carried out in a casting crucible, the bottom opening of which is sealed by a meltable seal, as described, for example, in the German patent 32 11 83 1, the melting of the seal should take place after a precisely predetermined time interval following ignition of the mixture in order to ensure that the reaction has come to an end and the slag has separated completely from the metal melt. If the seal melts too early, liquid slag particles, which have not yet been separated, can be carried along by the metal melt flowing out. If the seal melts too late, the melt may have already cooled too much and, with that, assume a state which is undesirable for certain technical processes.

Attempts have been made to improve the reproducibility of the metallothermal reactions by optimizing tile reaction crucible with respect to its shape (pointed cone with a different angle of slope), its size, lining, cover, etc. Certain improvements have been achieved. To a large extent, however, the manual dexterity and experience of the persons entrusted with carrying out the reaction affected the outcome of the reaction and its reproducibility.

OBJECT OF THE INVENTION

The present invention is concerned with the technical problem of evening out the metallothermal reaction, particularly the aluminothermal iron oxide reaction, for the purpose of improving the reproducibility of the course of the reaction and, with that, the reaction time and the reaction products. The improvement shall be achieved essentially by a particularly advantageous composition of the reaction mass without disregarding tile known possibilities of improving the equipment.

An object of tile present invention, therefore, is a metallothermal reaction mixture consisting of a metal oxide, a metal more electronegative than the metal of the metal oxide and, optionally, other additives, all components present in the the of small particles.

SUMMARY OF THE INVENTION

The inventive metallothermal reaction mixture is characterized in that at least 20% by weight of the metal oxide is present in the form of spherical particles with a particle size of more than 0 to 3.0 min.

Usually, for the production of metallothermal mixtures, forging scales, which are formed during rolling and wire drawing, are used as iron oxide. In the mixture, these forging scales are present in shapes which deviate greatly from one another: rod-shaped, flat, quasi-rectangular or oval and almost spherical particles, the mixture of which, even if the range of particle sizes is greatly limited, still can cause differences in the course of the reaction with the consequence of different heat losses due to nonuniform radiation or as a result of opening the seal of the casting crucible at the wrong time. Differences in the course of the reaction can also affect the composition of the end product.

When an inventive mixture is used, it is observed that the course of the reaction is stabilized. Without limiting the invention by subsequent assumptions concerning the possible reasons for this phenomenon, there is reason to believe that the stabilization of the course of the reaction is due to the use of metal oxide particles with a defined ratio of surface to mass, which is adjusted pursuant to the invention by at least partial replacement of the particles previously present in scattered shapes by particles having a spherical shape. It is thus possible, by selecting a suitable particle size, to produce reaction mixtures which have the desired reaction behavior.

In this connection, it is surprising that the aimed-for stabilization of the reaction sets in only when about 20% by weight of the conventional metal oxide particles are replaced by those having a spherical shape and increases steadily up to an optimum, which can still be detected statistically and occurs when about 90% by weight of the metal oxide particles are spherical.

Metal oxide particles can be converted into spherical shape by methods known from the art, such as pelletizing, for which the particles of the metal oxide, for example, iron oxide, are consolidated in a pug mill. The particles, obtained in spherical shape, are then screened to the desired particle size range.

A preferred mixture contains spherical particles ranging in size from 0.1 to 2.0 mm. Such a mixture reacts at a consistent rate and releases the amount of heat resulting from the reaction within a short time. Heat losses due to radiation are minimized.

The tendency to demix is a special problem of metallothermal reaction mixtures not present in consolidated form while these mixtures are being produced, transported, handled and put into and taken out of storage. This is attributed particularly to the differences in the specific weight of the components of the metallothermal reaction mixture.

It has now been found that it is possible to counteract this demixing with the inventive reaction mixtures. This is accomplished easily owing to the fact that the more electronegative metal, generally aluminum or calcium, is used in a form which deviates from the spherical and is predominantly irregular in shape and consists of particles ranging in size from more than 0 to 1.5 min. Due to the combination of the spherical metal oxide having a particular particle size with a reduction metal of particular particle size present in irregular shapes, a maximum is achieved in stabilizing the course of the reaction with the utmost reliability against demixing of the reaction mixture during transport, handling and storage.

In the inventive, metallothermal reaction mixture, the metal oxide preferably is iron oxide and the more electronegative metal preferably is aluminum. If necessary, alloy-forming agents can be added. In accordance with the methods already described, the spherical iron oxide can be obtained by consolidation in the pug mill or by other methods accessible to the expert without inventive effort. Iron oxide particles, obtained by other methods, can also be used provided they have a spherical shape. In particular and preferably, such iron oxide particles are those which are obtainable by recycling pickling bath residues. By such means, an industrial waste product, which is obtained in larger quantities, is utilized in an economically advantageous and technically valuable manner.

It is understood that the following examples are given by way of illustration and not by way of limitation. Examples of the inventive metallothermal reaction mixtures, in each case related to a basic aluminothermal mixture of iron oxide and aluminum totaling 1000 g in weight are:

Mixture 1:
800 g FeO, spherical, particle size range >0–3.0 mm
200 g Al, irregular, particle size range >0–1.5 mm
Mixture 2:
763 g $Fe_3O_4$ spherical, particle size range >0–3.0 mm
237 g Al, irregular, particle size range >0–1.5 mm
Mixture 3:
747 g $Fe_3O_3$, spherical, particle size range >0–3.0 mm
253 g Al, irregular, particle size range >0–1.5 mm
Mixture 4:
572 g $Fe_3O_4$, spherical, particle size range >0–3.0 mm
191 g $Fe_3O_4$ mill scale, particle size range >1–3.0 mm
237 g Al, irregular, particle size range >0–1.5 mm
Mixture 5:
448 g $Fe_2O_3$, spherical, particle size range >0–3.0 mm
299 g $Fe_2O_3$, mill scale, particle size range >0–1.5 mm
253 g Al, irregular, particle size range >0–1.5 mm
Mixture 6:
Like mixture 5, however, with the addition of 350 g of ferromanganese in particle form.

I claim:

1. A metallothermal reaction mixture consisting of iron oxide, aluminum and, optionally, further additives, comprising at least 20% by weight of the iron oxide being present in a spherical form or at least approximately spherical particles ranging in size of about between 0.1 and 2.0 mm, the aluminum being present in a form which deviates from the spherical and is predominantly irregular in shape with a particle size of about >0 to 1.5 mm.

2. The mixture of claim 1, comprising that the metal oxide is spherical iron oxide obtained by recycling pickling bath residues.

3. The mixture of claim 1, comprising the iron oxide being present in pelletized form.

* * * * *